(12) United States Patent
Townsend et al.

(10) Patent No.: US 8,204,206 B2
(45) Date of Patent: Jun. 19, 2012

(54) SYSTEMS AND METHODS FOR SELECTION OF A COMMUNICATION PATH

(75) Inventors: Robert Townsend, Mt. View, CA (US); Richard Southwick, San Francisco, CA (US); Mansour Salame, Atherton, CA (US)

(73) Assignee: 8x8, Inc., Sunnyvale, CA (US)

( * ) Notice: Subject to any disclaimer, the term of this patent is extended or adjusted under 35 U.S.C. 154(b) by 956 days.

(21) Appl. No.: 12/201,696

(22) Filed: Aug. 29, 2008

(65) Prior Publication Data

US 2010/0054448 A1 Mar. 4, 2010

(51) Int. Cl.
*H04M 3/00* (2006.01)
*H04M 5/00* (2006.01)

(52) U.S. Cl. ......... 379/265.01; 379/220.01; 379/221.08; 379/265.02

(58) Field of Classification Search .......... 379/265.01–265.02, 265.09, 220.01, 379/221.08
See application file for complete search history.

(56) References Cited

U.S. PATENT DOCUMENTS

| | | | |
|---|---|---|---|
| 5,887,139 A | 3/1999 | Madison, Jr. et al. | |
| 6,005,931 A | 12/1999 | Neyman et al. | |
| 6,154,465 A | 11/2000 | Pickett | |
| 6,201,863 B1 | 3/2001 | Miloslavsky | |
| 6,229,888 B1 * | 5/2001 | Miloslavsky | 379/265.01 |
| 6,278,777 B1 | 8/2001 | Morley et al. | |
| 6,393,467 B1 | 5/2002 | Potvin | |
| 6,553,115 B1 | 4/2003 | Mashinsky | |
| 6,687,241 B1 | 2/2004 | Goss | |
| 6,741,698 B1 | 5/2004 | Jensen et al. | |
| 6,760,429 B1 | 7/2004 | Hung et al. | |
| 6,804,345 B1 | 10/2004 | Bala et al. | |
| 7,028,091 B1 | 4/2006 | Tripathi et al. | |
| 7,028,331 B2 | 4/2006 | Schwalb | |
| 7,031,447 B2 * | 4/2006 | Mani | 379/201.06 |
| 7,124,171 B1 | 10/2006 | McCann | |
| 7,224,783 B2 | 5/2007 | Creamer et al. | |
| 7,328,001 B2 | 2/2008 | Dawson et al. | |
| 7,403,995 B2 | 7/2008 | Mace et al. | |
| 7,480,719 B2 | 1/2009 | Inoue | |
| 7,610,388 B2 | 10/2009 | Yamamoto | |
| 7,627,658 B2 | 12/2009 | Levett et al. | |

(Continued)

FOREIGN PATENT DOCUMENTS

WO WO-2010025110 A1 3/2010

(Continued)

OTHER PUBLICATIONS

Brown, Donald E, "The Interaction Center Platform", *Interactive Intelligence, Inc.*, (2005), 35 pgs.

(Continued)

*Primary Examiner* — Quynh Nguyen
(74) *Attorney, Agent, or Firm* — Crawford Maunu PLLC

(57) ABSTRACT

Embodiments of systems for selecting a communication path related to a networked contact center comprise a communication module configurable to receive data indicating that a customer of a tenant is seeking to initiate a communication with the tenant, and a path selection module configurable to register a first location, the first location being a geographical location of an agent associated with the tenant, determine a second location, the second location being a geographical location of the customer of the tenant, and based on the first location and the second location, establish the communication between the agent and the customer using a communication path having low communication latency.

23 Claims, 9 Drawing Sheets

U.S. PATENT DOCUMENTS

| | | |
|---|---|---|
| 7,644,172 B2 | 1/2010 | Stewart et al. |
| 7,730,204 B2 | 6/2010 | Pak |
| 2002/0198943 A1 | 12/2002 | Zhuang et al. |
| 2003/0123640 A1 | 7/2003 | Roelle et al. |
| 2003/0172131 A1 | 9/2003 | Ao |
| 2003/0195934 A1 | 10/2003 | Peterson et al. |
| 2003/0195943 A1 | 10/2003 | Bradshaw et al. |
| 2003/0208754 A1 | 11/2003 | Sridhar et al. |
| 2003/0236907 A1 | 12/2003 | Stewart et al. |
| 2004/0083292 A1 | 4/2004 | Lueckhoff et al. |
| 2004/0088300 A1 | 5/2004 | Avery et al. |
| 2005/0041647 A1 | 2/2005 | Stinnie |
| 2005/0047579 A1* | 3/2005 | Salame .................. 379/265.09 |
| 2005/0135600 A1 | 6/2005 | Whitman |
| 2006/0026304 A1 | 2/2006 | Price |
| 2006/0239440 A1 | 10/2006 | Shaffer et al. |
| 2007/0127665 A1 | 6/2007 | Brandt et al. |
| 2007/0162908 A1 | 7/2007 | Erickson et al. |
| 2007/0192415 A1 | 8/2007 | Pak |
| 2008/0037760 A1 | 2/2008 | Boughton et al. |
| 2008/0072264 A1 | 3/2008 | Crayford |
| 2008/0177994 A1 | 7/2008 | Mayer |
| 2008/0178278 A1 | 7/2008 | Grinstein et al. |
| 2009/0055195 A1 | 2/2009 | Karlsgodt |
| 2009/0061850 A1 | 3/2009 | Li et al. |
| 2009/0064148 A1 | 3/2009 | Jaeck et al. |
| 2009/0066788 A1 | 3/2009 | Baum et al. |
| 2009/0133031 A1 | 5/2009 | Inoue |
| 2009/0190728 A1 | 7/2009 | Bushnell et al. |
| 2009/0216683 A1 | 8/2009 | Gutierrez |
| 2010/0054439 A1 | 3/2010 | Salame et al. |
| 2010/0054450 A1 | 3/2010 | Southwick et al. |
| 2010/0054451 A1 | 3/2010 | Townsend |
| 2010/0057927 A1 | 3/2010 | Southwick et al. |
| 2010/0058234 A1 | 3/2010 | Salame et al. |
| 2010/0232583 A1 | 9/2010 | Bettis et al. |

FOREIGN PATENT DOCUMENTS

| | | |
|---|---|---|
| WO | WO-2010025112 A1 | 3/2010 |
| WO | WO-2010025113 A1 | 3/2010 |

OTHER PUBLICATIONS

"U.S. Appl. No. 12/201,599, Preliminary Amendment mailed Dec. 8, 2009", 10 pgs.

"U.S. Appl. No. 12/201,639, Preliminary Amendment mailed Jul. 1, 2010", 11 pgs.

"U.S. Appl. No. 12/201,671, Final Office Action mailed Dec. 14, 2010", 24 pgs.

"U.S. Appl. No. 12/201,671, Response Filed Jun. 14, 2011 to Final Office Action", 14 pgs.

"U.S. Appl. No. 12/201,671, Response filed Sep. 28, 2010 to Non Final Office Action mailed Jun. 28, 2010", 11 pgs.

"U.S. Appl. No. 12/201,726, Final Office Action mailed Apr. 18, 2011", 16 pgs.

"U.S. Appl. No. 12/201,726, Non-Final Office Action mailed Oct. 12, 2010", 17 pgs.

"U.S. Appl. No. 12/201,726, Response filed Jan. 12, 2011 to Non-Final Office Action mailed Oct. 12, 2010", 13 pgs.

"U.S. Appl. No. 12/201,726, Response filed Jun. 20, 2011 to Final Office Action mailed Apr. 18, 2011", 14 pgs.

Fielding, et al., "HTTP/1.1: Connections, 8 Connections", Part of Hypertext Transfer Protocol—HTTP/1.1, RFC 2616, [Online]. Retrieved from the Internet Jan. 12, 2011: <URL: http://www.w3.org/Protocols/rfc2616/rfc2616-sec8.html>, 6 pgs.

Fielding, R., et al., "Hypertext Transfer Protocol—HTTP/1.1, Chapters 1-9.1.2", (Jun. 1999), 22 pgs.

Infrequently Noted, "Comet: Low Latency Data for the Browser", [Online]. Retrieved from the Internet: <URL:http://infrequently.org/2006/03/comet-low-latency-data-for-the-browser>, (Mar. 3, 2006), 5 pgs.

McCarthy, Philip, "Ajax for Java developers: Write scalable Comet applications with Jetty and Direct Web Remoting", [Online]. Retrieved from the Internet: <URL: http://www.ibm.com/developerworks/java/library/j-jettydwr/index.html>, (Jul. 17, 2007), 16 pgs.

"U.S. Appl. No. 12/201,671 Non-Final Office Action mailed Jun. 28, 2010", 21 pgs.

"International Application Serial No. PCT/US2009/054780, Search Report mailed Oct. 8, 2009", 4 pgs.

"International Application Serial No. PCT/US2009/054780, Written Opinion mailed Oct. 8, 2009", 5 pgs.

"International Application Serial No. PCT/US2009/054787, Search Report mailed Oct. 13, 2009", 4 pgs.

"International Application Serial No. PCT/US2009/054787, Written Opinion mailed Oct. 13, 2009", 6 pgs.

"International Application Serial No. PCT/US2009/054788, Search Report mailed Oct. 13, 2009", 4 pgs.

"International Application Serial No. PCT/US2009/054788, Written Opinion mailed Oct. 13, 2009", 5 pgs.

* cited by examiner

SYSTEMS AND METHODS FOR SELECTION OF A COMMUNICATION PATH

TECHNICAL FIELD

This application relates generally to methods and systems for managing networked contact centers, and more specifically for selecting a communication path.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, CONTACTUAL, INC., All Rights Reserved.

BACKGROUND

Traditionally, networked contact centers are referred to as call centers and designed to enable a company to handle calls from their clients. The calls received from clients may be distributed to multiple call agents according to certain call distribution and handling methodologies. Ideally, a call center is designed to handle calls with minimal client waiting time, minimal dropped calls, even-call distribution to agents, and minimal downtime. Any drastic fluctuations in one or more of these criteria may result in loss of business and/or customer dissatisfaction.

Traditional call centers are normally built to be operated on-premise using proprietary systems with proprietary hardware and software. These on-premise call center systems are generally very costly to maintain. The systems typically require support staff. Furthermore, the systems may be inflexible in the type of applications and hardware that can be supported, limiting the company's ability to upgrade and grow along with any potential increase in demand. Even when the upgrade options are available, they tend to be very costly and may require replacing a current system with another more advanced system, causing further stress to the supporting staff, the agents and the clients. Further, when the call centers include agents located in different geographical areas, support services may become more complex.

BRIEF DESCRIPTION OF DRAWINGS

Some embodiments are illustrated by way of example and not limitation in the figures of the accompanying drawings in which.

DETAILED DESCRIPTION

Figure 1:
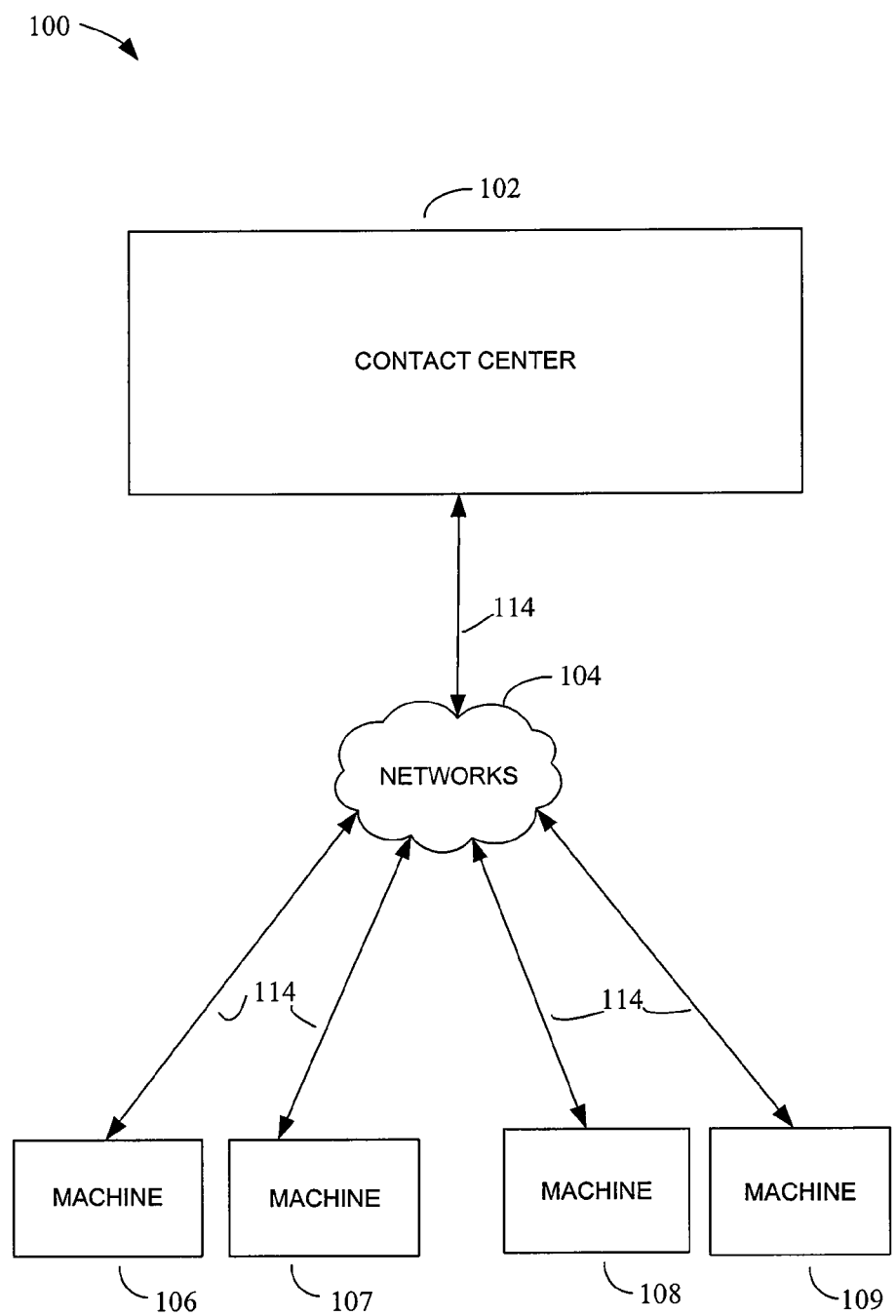
FIG. 1 is a high level diagrammatic representation of an on-demand contact center, according to an example embodiment.

Example methods and systems to select a communication path in a networked contact center are described. An example method may comprise registering the location of an agent associated with a tenant, receiving data indicating that a customer of the tenant is seeking to initiate a communication with the tenant, and determining the location of the agent associated with the tenant.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Introduction

A tenant of a networked contact center may have a plurality of agents to handle calls from their customers. The plurality of agents may be located in a single geographical region, or they may be located in different geographical regions. One potential problem with having agents in multiple geographical regions is communication latency. When there is too much communication latency, the quality of a call between a customer and an agent of a tenant may decrease.

The systems and methods for selection of a communication path described in some example embodiments may be utilized to decrease the communication latency caused by having agents located in regions geographically remote from the tenant and from each other.

The systems and methods for selection of a communication path described in some example embodiments may permit configuring network servers so that the communications may reach a network server nearest to the source of the communication before the communication is delivered elsewhere. From the nearest network server, the communications may be delivered to an answering agent located anywhere in the world. Thus, the systems and methods for selection of a communication path may permit local response to communications that are subsequently delivered globally. In addition to the ability to receive and deliver communications globally, the systems and methods for selection of a communication path may permit recognizing an incoming event when the event arrives and associating the event with a tenant anywhere in the world.

In some example embodiments, the systems and methods for selection of a communication path are facilitated by proxy servers. A communication may arise in multiple locations (e.g., Canada, Japan, Australia, the United Kingdom, or the United States). For example, a communication may arise at a UK proxy server. A networked contact center located in the US may determine which tenant the communication is associated with and a location where an answering agent may be available. Once the location of the appropriate agent is determined, the information is sent back to the proxy server. This approach may reduce the communication latency because it does not bring the communication to the networked contact center, which may be too remote from the source of the communication. Instead, the proxy server directs the call to a nearby answering agent. For example, the networked contact center located in the US may direct the UK proxy server to send the communication to a tenant in India.

For some example embodiments, a communication may include a control channel and a data channel. For some example embodiments, in order to be able to receive information concerning a communication in one geographical location and direct the communication to a different geographical location, the control and the answering channels of communication are decoupled. The decoupling permits the communication to be answered in local regions or markets (e.g., the United Kingdom), close to where the communication originates (e.g., location of the caller or customer of the tenant). However, the locations of the answering agents and the logic that determines the locations of the answering agents and the activities of the agents can be somewhere else (e.g., the United States). For some example embodiments, the proxy servers may be located at various sites around the world. A caller or a customer of a tenant originating the communication and the answering agent are connected through the most appropriate proxy server regardless of where they are, without going through the networked contact center. By avoiding going through the networked contact center, communication latency may be decreased.

In some example embodiments, the communication latency may be further decreased when the answering agent and the user originating the communication are connected directly. However, in order to be able to capture the communication, the communication needs to be routed through a proxy server where it is to be recorded. Therefore, for the communication to be captured two different communications need to be established, one between the user and the proxy server, and one between the proxy server and the agent.

The method permits routing the communication to an appropriate agent via the shortest available network path. The systems and methods for selection of a communication path may utilize the Session Initiation Protocol (SIP) to establish communications. SIP is a signaling protocol that may be utilized in setting up and tearing down multimedia communication sessions such as voice and video calls over the Internet. SIP may also provide a signaling and calls setup protocol for IP-based communications that support a superset of the call processing functions and features present in the Public Switched Telephone Network (PSTN).

SIP may emulate features of the PSTN such as dialing a number and causing a telephone to ring. SIP may work in concert with several other protocols. Thus, SIP "sessions" may embody packet streams of the Real-time Transport Protocol (RTP) with the RTP carrying the actual voice or video content of the communication.

For some example embodiments, proxy servers may be utilized for selection of a communication path. Although two SIP endpoints may communicate without any intervening SIP infrastructure, SIP may require proxy servers to work as a practical service. Proxy servers may help route requests to the user's current location, authenticate and authorize users for services, implement provider call-routing policies, and provide various features to users. SIP may also provide a registration function that allows users to upload their current locations for use by proxy servers.

For example, a client of a networked contact center such as the networked contact center of FIG. 1 may have an associated agent in California responding to a telephonic call from a customer who is also located in California. The customer may use the PSTN to place the telephone call. Dialed Number Identification Service (DNIS) permits identification of the number dialed by the customer because a company may have a different toll free number for each product line it sells. If a call center is handling calls for multiple product lines, the switch that receives the call can examine the DNIS and play the appropriate recorded greeting.

The SIP component of the telephone call that provides control is not sensitive to delays. For example, one of the control functions is to initiate the telephone call. Because it may not be important to the quality of communication whether the telephone rings a second earlier or later a delay in establishing a communication is acceptable. Therefore, the telephone call control may still be kept in one centralized location regardless of the relative locations of the centralized location, the customer, and the agent. However, the delays in the voice component of the telephone call are important because the quality of the conversations may deteriorate considerably as delays increase. The systems and methods for selection of a communication path may facilitate determining the shortest path to an appropriate agent.

Automatic Number Identification (ANI) may be utilized to determine the telephone number used to originate the telephone call. Based on the determination made with respect to the origin of the telephone call, a customer may be connected to the SIP proxy located locally with respect to the customer and played a greeting. The greeting (e.g., welcome to Intel, press 1 for sales or press 0 if you want to talk to an operator) may be based on the determination of the telephone number dialed by the customer performed by DNIS.

Some agents associated with the client may be unacceptable to receive the telephone call due to their remoteness from the customer and the corresponding latency of the communications. The systems and methods for selection of a communication path may be utilized to determine which agents are within the shortest path of the customer.

Typically, the packets would travel to the local (e.g., the United Kingdom) PSTN first, then cross over to the PSTN local to the hosted service (e.g., the USA) before a SIP session is created to reach the agent's SIP telephone. The systems and methods for selection of a communication path may provide SIP proxies, which are placed in several geographical locations. Agents associated with the client are registered to these SIP proxies. Because all agents are registered to these proxy servers, each proxy server knows the agents' statuses. The communication queue may be duplicated in multiple locations but this does not result in duplicate communications. No duplication of communications is possible because there is only one global queue being copied by the SIP proxy servers in multiple geographic locations.

Thus, instead of the packets having to travel all the way to the location of the networked contact center and back to the agent, the systems and methods for selection of a communication path may enable a customer to be connected to an agent by a shortest path.

Networked Contact Center

FIG. 1 is a block diagram showing an example networked contact center 100, in accordance with an example embodiment. FIG. 1 is shown to include a networked contact center 102 that is communicatively coupled with networks 104, via transmission media 114. Also communicatively coupled with the networks 104, via the transmission media 114, are machines 106-109. One or more of the machines 106-109 may be used by call agents or call supervisors associated with a company (also referred to as a tenant). One or more of the machines 106-109 may be used by customers or potential customers of the company.

The networks 104 may be used to communicatively couple the networked contact center 102 with the machines 106-109. In an example embodiment, networks 104 include the Internet and a public switched telephone network (PSTN). Other types of networks may be included within the networks 104 without departing from the claimed subject matter. The transmission media 114 may include any transmission media appropriate for supporting the networks 104. In an example embodiment, the transmission media 114 may include one or more of optical fiber, twisted pairs and wireless media. Other transmission media not described may also be used.

Contact made between the networked contact center 102 and the various machines 106-109 may include various modes of communications (e.g., electronic communications) that may be digitally encoded, composed of analog signals and/or include a combination of digital and analog communication. Some example types of contact may include communications made via Voice Over Internet Protocol (VoIP), analog telephone, online chat, text messaging, electronic mail (email), video conferencing, screen sharing, web conferencing and file sharing, radio broadcast, etc. It is to be appreciated that example forms of communication are provided herein to illustrate types of contact and not to limit the meaning of contact to certain forms of communication.

The networked contact center 102 may perform various contact related tasks (described in more detail below), on behalf of one or more tenants. The networked contact center 102 may be implemented in software, hardware or a combination of both software and hardware. The networked contact center 102 may comprise contact center machines (not shown) that execute instructions to perform the various contact related tasks (e.g., call distribution, call routing, call prioritizing, call transferring, etc.). One or more of the contact center machines may include interface hardware to communicate with the machines 106-109 via the transmission media 114 and the networks 104. It may be noted that the number of customers, agents or supervisors (and e.g., machines used by the customers, agent and supervisors) that communicate with the networked contact center 102 may be significantly increased when the number of tenants supported by the networked contact center 102 also increases. One or more of the contact center machines may be responsible for storing data associated with the one or more tenants. The data may include, for example, tenant-specific call configuration, agents' identification, supervisors' identification, call recordings, call statistics, etc. For some example embodiments, there may be multiple instances of the same data that may be used as backup and for recovery purposes.

Tenant

A tenant is an entity (e.g., a company, an employer, etc.) that seeks to address contacts made by other entities (e.g., customers, employees, associates, etc.) with which the tenant has a relationship. To help respond to such contact, an example tenant may use the networked contact center 102 to receive the contact, organize the contact, allocate the contact, transmit the contact and to perform other networked contact center related services for the benefit of the tenant. In addition to using the networked contact center 102, a tenant may look to yet further entities (e.g., agents, consultants, business partners, etc.) to help address the various contact referred to above (e.g., contact from the customers, associates, etc.).

Entities such as, for example, agents and customers may transmit and/or receive communications using the machines 106-109. The machines 106-109 may include interface hardware (not shown) and software to transmit and/or receive communications via the transmission media 114 to and/or from the networks 104 and the networked contact center 102. It is to be noted that the machines 106-109 may represent different types of machines (e.g., personal computers (PCs), mobile devices, telephones or any other network device). In an example embodiment, an entity associated with the machine 106 is a tenant's agent and a different entity associated with the machine 108 is the tenant's customer. In various example embodiments, on behalf of the tenant, the agent using the machine 106 may communicate via the networks 104 and the networked contact center 102 with the customer that is using the machine 108.

Contact Center Functional Modules

Figure 2:
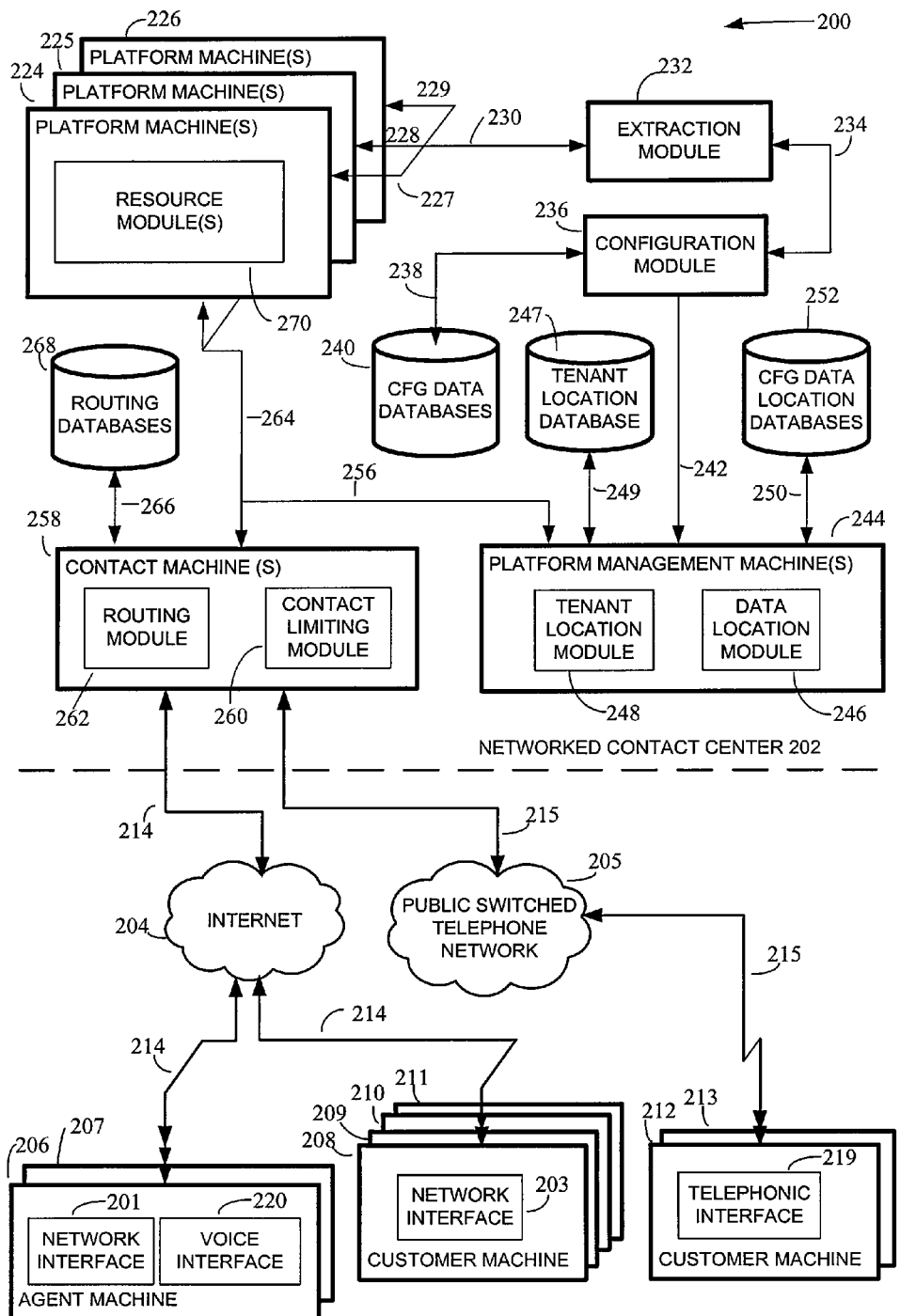
FIG. 2 is a further diagrammatic representation of an on-demand contact center, according to an example embodiment.

FIG. 2 is a block diagram illustrating a network 200, in accordance with an example embodiment. The network 200 is shown to include an example networked contact center 202 communicatively coupled with agent machines 206, 207 and customer machines 208-211 via the transmission media 214 of the Internet 204. The example networked contact center 202 is further communicatively coupled with customer machines 212 and 213 via the transmission media 215 of the PSTN 205.

Although the current example may illustrate customers and agents associated with one tenant, it is to be understood that the networked contact center 202 may be configured to support or host multiple tenants (and therefore may also be referred to as a hosted networked contact center or just a hosted contact center). For some example embodiments, the tenants may not need to install any call-distribution system on-premise. To host these multiple tenants, the networked contact center 202 may include multiple platforms and databases to store configurations specific to each tenant. The networked contact center 202 may also implement backup and recovery schemes to reduce system down time.

Figure 3:
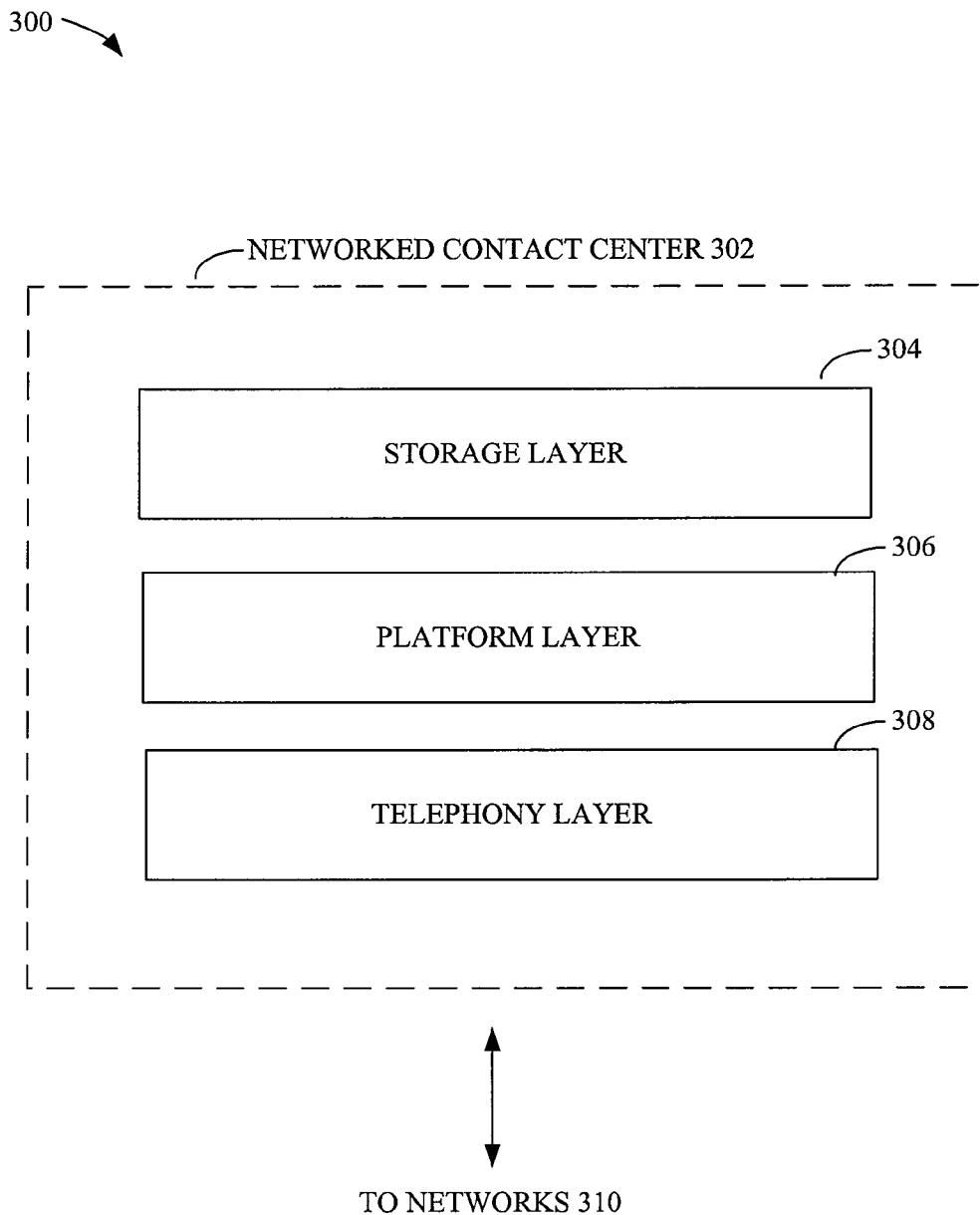
FIG. 3 is a block diagram illustrating a further network including a networked contact center organized into layers, in accordance with an example embodiment.

FIG. 3 is a block diagram illustrating a further network 300 including networked contact center 302 organized into layers, in accordance with an example embodiment. The networked contact center 302 may be substantially similar to the networked contact center 202 of FIG. 2. The networked contact centers 202, 302 may be organized into multiple logical groups or layers. There may be a storage layer 304, a platform layer 306 and a telephony layer 308. For some example embodiments, the telephony layer 308 may be responsible for receiving calls that come into the networked contact centers 202, 302. Depending on the dialed number associated with the call, the telephony layer 308 distributes the call to an appropriate platform in the platform layer 306. For some example embodiments, each platform in the platform layer 306 may be associated with one or more machines (also referred to as platform machines). Each platform server may support one or more tenants. For some example embodiments, each tenant may be associated with two or more platforms. A first platform may be used as a primary platform, and a second platform may be used as a backup platform. Incoming calls distributed to a tenant may always be directed to the primary platform unless the tenant is reconfigured to direct the incoming calls to the backup platform. For some example embodiments, the backup platform is operational while the primary platform is operational even when all calls are being processed by the primary platform. This may be valuable when there are problems with the primary platform since switching the operations to the backup platform may not cause too much delay in the call handlings associated with the tenant.

For some example embodiments, the multiple platforms in the platform layer 306 may share the same data in the storage layer 304. The storage layer 304 may be associated with databases and associated database machines. The storage layer 304 may itself be partitioned into multiple images for backup and recovery, and for efficient access. For some example embodiments, mappings may be used to relate a tenant on a particular platform to the tenant's data in the storage layer 304.

Thus, the networked contact center 302 may include logic to receive calls, to determine to which of the multiple supported tenants the calls belong, to distribute the calls to the right platform, and to determine where the data associated with the tenant may be found.

Using the organization described above, the networked contact center 102 of FIG. 1 may be easily upgraded and maintained with little or minimal impact to the tenant. For example, a tenant may be operating with a backup platform while the primary platform is upgraded from one software level to another software level. Once the upgrade is completed, operations may be switched back to the primary platform. Similarly, because both the primary platform and the backup platform share the same data in the storage layer 304 of FIG. 3, switching from the backup platform to the primary platform can be accomplished with minimal impact to the tenant and system availability. It may be noted that some calls may be affected during the switch; however, as is typical with telephone calls, the customers may re-dial or call the tenant again. It may be likely that the re-dialed calls may be received by the networked contact center 102 after the switch is complete.

Referring to FIG. 2, platform machines 224-226 may be communicatively coupled with an extraction module 232 via communication channels 227-229, respectively, and communication channel 230. Platform machines 224-226 are further communicatively coupled to contact machine(s) 258. The contact machine(s) 258 are communicatively coupled with the routing databases 268 via the communication channel 266.

Platform management machine(s) 244 are shown to be communicatively coupled with configuration data location databases 252 via communication channel 250, the tenant location database 247 via communication channel 249 and with the contact and platform machine(s) 258 and 224-226, respectively, via the communication channels 256 and 264. The platform management machine(s) 244 are further shown to be communicatively coupled with the configuration module 236 via communication channel 242, while the configuration module 236 is communicatively coupled with the extraction module 232 and the configuration data databases 240 via communication channels 234 and 238, respectively. The machines and modules of FIG. 2 are to be described in further detail with respect to FIG. 4, which follows.

Flow Diagram

Figure 4:
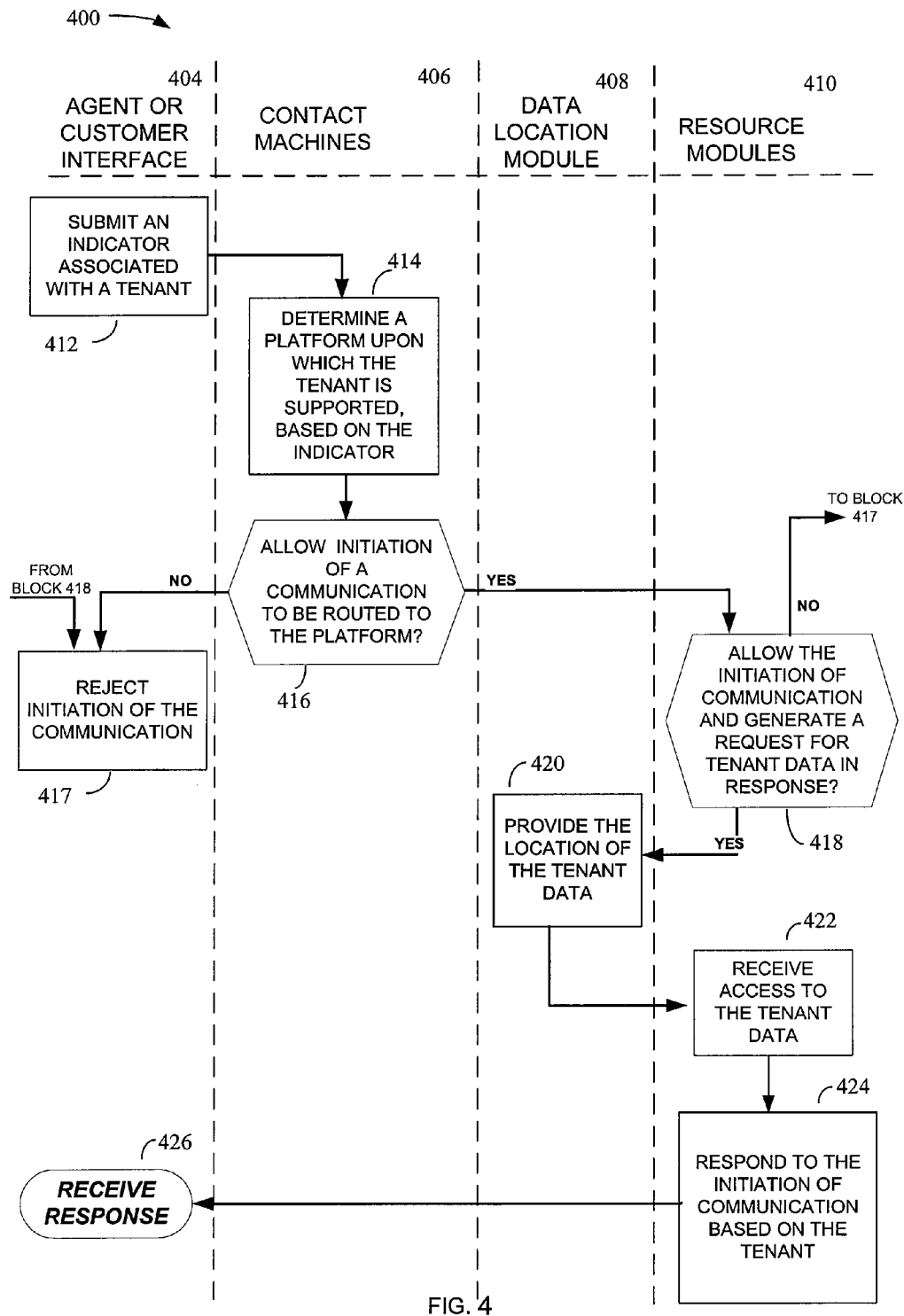
FIG. 4 is a flow diagram illustrating example actions performed by various on-demand contact center components in response to agent or customer contact, according to an example embodiment.

FIG. 4 is a flow diagram 400 showing example actions performed by various components of a networked contact center for responding to agent or customer contact, in accordance with an example embodiment. In FIG. 4, each column represents a lane in which action(s) are carried out. Actions in lanes 404, 406, 408 and 410 may be performed by certain machines and/or modules shown in FIG. 2. It may be noted that a module may represent software, hardware and/or a combination of software and hardware used to implement logical constructions and/or to process instructions. Although shown in separate lanes, one module may be included in, or composed of, one or more of the other modules.

The flow diagram 400 may begin at block 412 with an agent or customer submitting an indicator associated with a tenant along with an initiation of communication. In FIG. 2, the customer machine 212 is shown to include a telephonic interface 219 (e.g., a telephone with a handset). In an example embodiment, a customer seeking customer support from a tenant dials a tenant's phone number on a telephone to place a call (e.g., initiation of communication) to the networked contact center over the PSTN. In an example embodiment, the telephone number itself serves as an indicator of the tenant whose attention is sought by the customer.

The customer machine 208 is shown to include a network interface 203 (e.g., a web browser) with which a customer may, for example, submit a chat request to the networked contact center 202 over the Internet to receive, for example, technical support from a tenant. An agent of the tenant or a contact supervisor may also contact the tenant. In an example embodiment, an agent using the agent machine 206 uses the network interface 201 to log on to an agent network server hosted by the networked contact center 202 to notify the networked contact center 202 that the agent is available to be contacted by customers. In some example embodiments, the agent may use the voice interface 220 to speak with a customer or another agent.

In various example embodiments, the indicator submitted at block 412 is received by the contact machine(s) 258. In FIG. 2, the contact machine(s) 258 are shown to include a routing module 262 and a contact limiting module 260. The routing module 262 may route contacts to a certain platform depending on the tenant indicated by the indicator (e.g., a phone number, username/password or any other indicator designating a tenant). The example contact limiting module 260 may regulate incoming contact with the networked contact center 202.

At block 414, the routing module 262 within the contact machines 258 of FIG. 2 may determine a platform upon which the tenant is supported based on the indicator received from the agent or customer at block 412. In an example embodiment, in FIG. 2, the routing module 262 accesses the routing databases 268 via communication channel 266 to associate an indicator with a tenant and a platform. In some example embodiments, the contact machine(s) 258 submit a request, via the communication channel 256 to the platform management machine(s) 244 to determine a platform associated with the indicator (e.g., and a tenant corresponding to the indicator).

At decision block 416, the example flow diagram 400 includes the example contact limiting module 260 within the contact machines 258 of FIG. 2 determining whether to allow the initiation of communication (e.g., a telephone call from a customer) to be routed to a platform (e.g., the platform machine(s) 224).

The contact limiting module's 260 determination of whether to allow the initiation of communication may include referencing a current allowance of contact or communication (e.g., a bucket value, described in more detail below) to be received by a particular communication layer or platform (e.g., within the platform machines 224) in a fixed period of time. In some example embodiments, each platform may vary a maximum allowance of contact for a period of time or vary the period of time based on an availability of platform resources. In some example embodiments, when contact directed to a platform is received by the contact machines 258 and the current allowance is less than or equal to zero, the contact limiting module 260 may reject initiation of the communication as shown in block 417 of FIG. 4. When the contact directed to the platform is received by the contact machines 258 and the current allowance is greater than or equal to one, the contact limiting module 260 may allow the initiation of communication to be routed to the platform as shown between blocks 416 and 418 of FIG. 4.

Alternatively or additionally, determination of whether to allow the initiation of communication may be made by a platform at block 418 after the contact limiting module has allowed the initiation of communication to be routed to the platform at block 416. In various example embodiments, a platform may reject the initiation of communication based on availability of platform resources or other conditions warranting a rejection. Such a rejection is represented by block 417.

In an example embodiment, in FIG. 2, a platform may allow the initiation of communication from the contact machine(s) 258. Example resource module(s) 270 located on the platform machine 224 and located on the other platform machines 225-226, may include various modules that provide services for multiple tenants. Example resource module(s) 270 may include interaction routers, interactive voice recordings, scripting, agent network server, media control and other contact center related services, etc.

In an example embodiment, the initiation of communication is a voice call from a customer seeking help with installing a water heater; the tenant is in the business of providing technical support for refrigerator installations and water heater installations. The tenant employs some agents who address questions about refrigerator installations while the tenant's other agents address questions about water heater installations.

At block 418, the flow diagram 400 includes the resource module(s) 270 of FIG. 2 allowing the initiation of communication and generating a request for data associated with a tenant, based on the initiation of communication. In the appliance installation example, the resource module(s) 270 request tenant data to be used to teleprompt the customer, prompting the customer to press 1 on their telephone dial for refrigerator installation support or to press 2 for water heater installation support.

Example platform machine(s) 224, 225 and 226 may initially request the data associated with the tenant from the extraction module 232 and the configuration module 236. In an example embodiment, to locate data for data access, the resource module(s) 270 may use a different addressing system than the configuration module 236 uses to locate and access the same data. In some example embodiments, the extraction module 232 translates requests from the platform machine(s) 224, 225, 226 to allow the configuration module 236 to understand the request. The configuration module 236 may access the requested data in the configuration data databases 240 and relay the requested data to the resource module(s) 270 on a set of platform machine(s) (e.g., platform machine(s) 224) via the extraction module 232.

The configuration module 236 may not initially locate the requested data in the configuration data databases 240. In some example embodiments, the configuration module 236 may request the location of the requested data from the data location module 246 that may be located within the platform management machine(s) 244.

At block 420, the flow 400 may include the data location module 246 providing the location of the requested data (e.g., the location within the configuration data databases 240) to the configuration module 236. The configuration module 236 may then access the requested data to provide it to the resource module(s) 270 via the extraction module 232.

At block 422 of the flow 400, the example resource module(s) 270 receive access to the requested data (e.g. tenant data). With access to the particular tenant data, an example resource module 270 may generate a particular response to the initiation of communication received from the agent or customer.

At block 424 of the flow 400, the resource module(s) 270 respond to the initiation of the communication based on the data (e.g., the tenant data). The agent or customer that initiated communication may receive the response where the flow ends at terminal 426. In the appliance installation support example, the response to the initiation at terminal 426 may be the tenant's teleprompter asking the customer to indicate the nature of the call.

Figure 5:
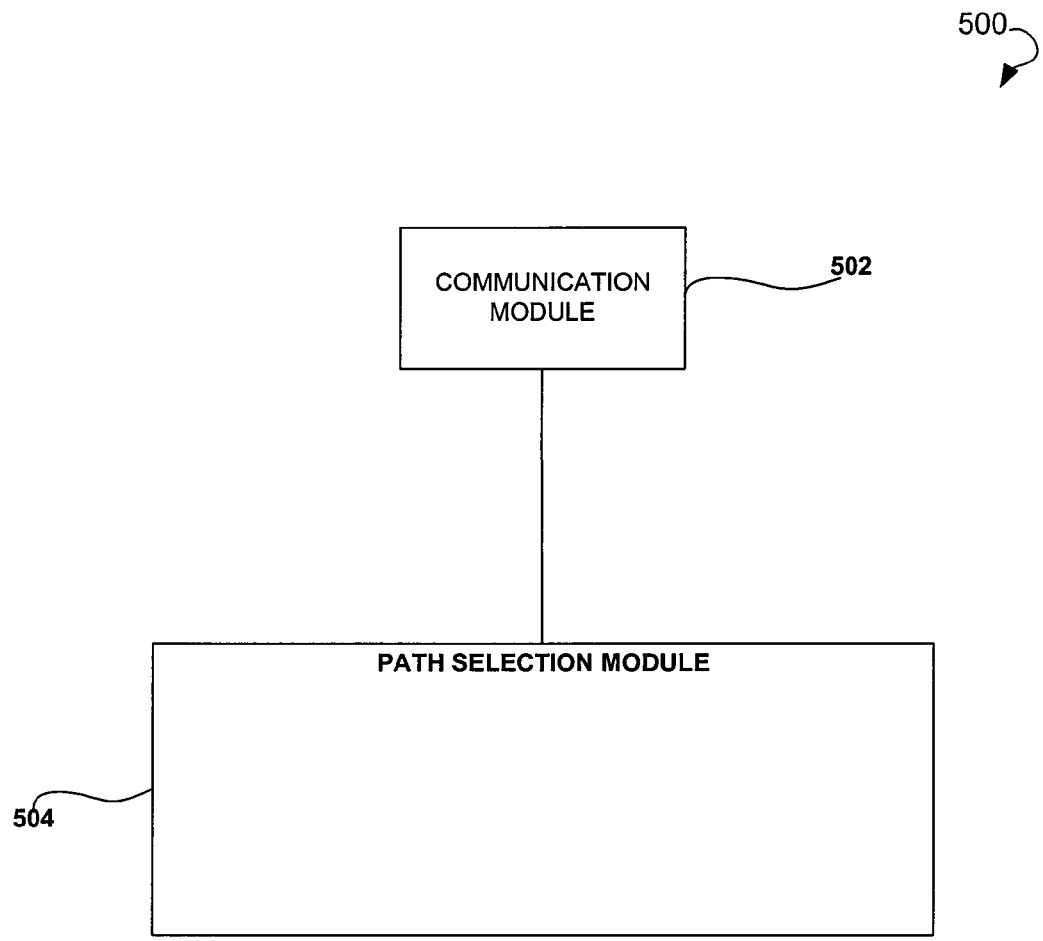
FIG. 5 is a block diagram illustrating a path selection engine, in accordance with an example embodiment.

FIG. 5 is a block diagram illustrating a system for selecting a path in media communications 500, in accordance with an example embodiment. The example system for selecting a communication path 500 is shown to include components that may be configured to perform various operations facilitating selection of a path in media communications. In some example embodiments, the system for selecting a communication path 500 may include a communication module 502 and a path selection module 504.

The communication module 502 may be configured to receive a communication via the proxy servers. The communication may include control data and media data. In some example embodiments, communications received at the proxy servers may be established via SIP. The control data may be received via Real-time Transport Control Protocol (RTCP). The media data may be received via Real-time Transport Protocol (RTP). The communication may be first received via Public Switched Telephone Network (PSTN) and connected to the Voice over Internet Protocol (VoIP) network through a gateway.

As already mentioned above, the proxy servers located at different geographical locations may maintain duplicate queues of service agents registered with the proxy servers based on the global queue of service agents. The path selection module 504 may be configured to register one or more service agents with one or more proxy servers located at different geographical locations. The path selection module 504 of FIG. 5 may be configured to determine which clients are associated with the incoming communications and the geographical locations of the customers initiating the communications based on the control data accompanying the communications.

Based on the determinations made by the path selection module 504, the media data may be directed to appropriately located service agents associated with respective tenants. This approach may reduce the latency in the communications by directing the communication to the nearest appropriate service agent without passing though the contract center. Various operations performed by the system for selecting a communication path 500, according to an example embodiment, are described by a way of example with reference to FIG. 7 and FIG. 8.

Figure 6:
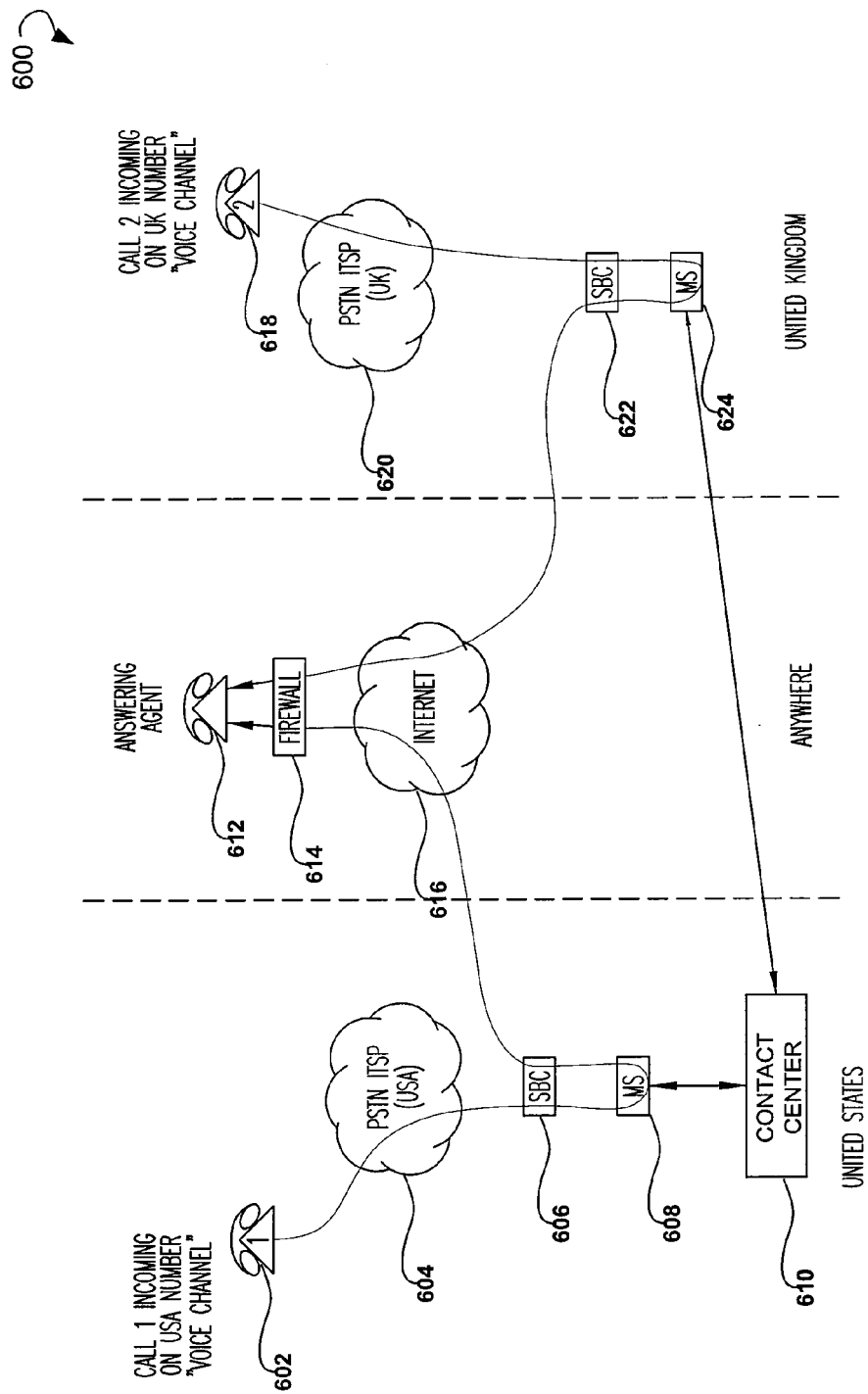
FIG. 6 is a flow diagram illustrating multi-registration and best path, in accordance with an example embodiment.

FIG. 6 is a flow diagram 600 illustrating multi-registration and best path, in accordance with an example embodiment. Two side lanes are designed by the geographical locations associated where actions take place. The lanes are designated the United States and the United Kingdom with substantially the same elements except for a networked contact center 610 being located in the US lane. Other elements common to the US and UK lanes are telephones 602 and 618, PSTN networks 604 and 620, Session Border Controllers (SBCs) 606 and 622, and mobile stations (MSs) 608 and 624. The middle lane titled "anywhere" includes the telephone 612 associated with the answering agent, a firewall 614, and an internet 616.

The telephones 602, 612, and 618 may include conventional telephones configured to work with PSTN as well as VoIP devices. Regardless of the technology utilized, the telephones 602, 612, and 618 may feature familiar telephone-like operations such as dialing a number, causing a telephone to ring, hearing ring back tones or a busy signal. SIP "sessions" are packet streams of the RTP. RTP is the carrier for the actual voice or video content itself. The telephones 602, 612, and 618 shown in FIG. 6 may include hardware endpoints, which are devices with the look and feel of a traditional telephone, but that use SIP and RTP for communication.

The MSs 608 and 624 may comprise user equipment and software needed for communication with a Wireless telephone network. The SBCs 606 and 622 are devices utilized in some VoIP networks to exert control over the signaling and usually also the media streams involved in setting up, conducting, and tearing down calls. Within the context of VoIP, the word Session in Session Border Controller may refer to a telephone call. Each call may consist of one or more call signaling streams that control the call, and one or more call media streams, which carry the call's audio, video, or other data along with information concerning how that data is flowing across the network. Together, these streams make up a session, and it may be the job of a Session Border Controller to exert influence over the data streams that make up one or more sessions. The firewall 614 of FIG. 6 may be utilized to block media packet types such as UDP.

The word Border in Session Border Controller may refer to a point of demarcation between one part of a network and another. For example, at the edge of a corporate network, a firewall demarks the local network (inside the corporation) from the rest of the Internet (outside the corporation). The word Controller in Session Border Controller may refer to the influence that Session Border Controllers have on the data streams that comprise Sessions, as they traverse borders between one part of a network and another. Additionally, Session Border Controllers often provide measurement, access control, and data conversion facilities for the calls they control.

Figure 7:
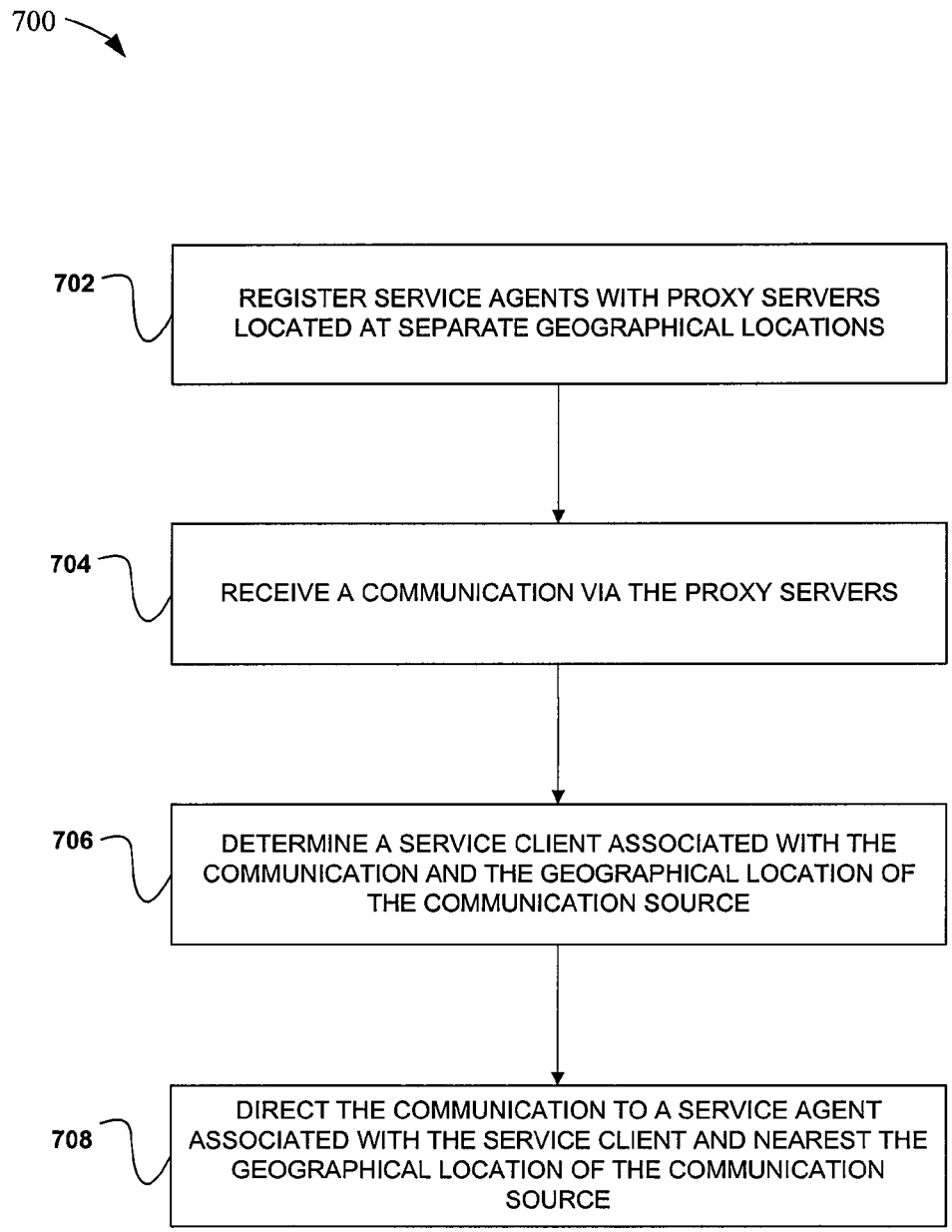
FIG. 7 is a flow diagram illustrating a high-level method for selection of a communication path, in accordance with an example embodiment.

FIG. 7 is a flow diagram illustrating a high-level method for selection of a communication path, in accordance with an example embodiment. The method 700 may be performed by processing logic (e.g. dedicated logic, programmable logic, microcode, etc.) that may comprise hardware, software (such as that run on a general-purpose computer system or a dedicated machine), or a combination of both. In one example embodiment, the method 700 may be performed by the modules discussed above with reference to FIG. 5. Each of these modules may comprise processing logic. As shown in FIG. 7, the method 700 may commence at operation 702 with the agent register 502 of FIG. 5 registering one or more service agents with proxy servers located at separate geographical locations. The service agents may be associated with their respective tenants.

At operation 704 of FIG. 7, the communication module 502 of FIG. 5 may receive a communication from a customer. The request may be entered by a user via a web interface communicatively coupled to the communication module 502. The communication may include control data and media data. At operation 706 of FIG. 7, the path selection module 504 of FIG. 5 may determine, based on the control data, to which tenant the communication relates and the geographical location of the customer originating the communication. At operation 708 of FIG. 7, the path selection module 504 of FIG. 5, based on the geographical location of the tenant, may direct the media data to the service agent associated with an appropriate tenant. The determination of the service agent is based on the registration with a proxy server. The communication is thus directed via the shortest path resulting in reduction of latency of the communication.

Figure 8:
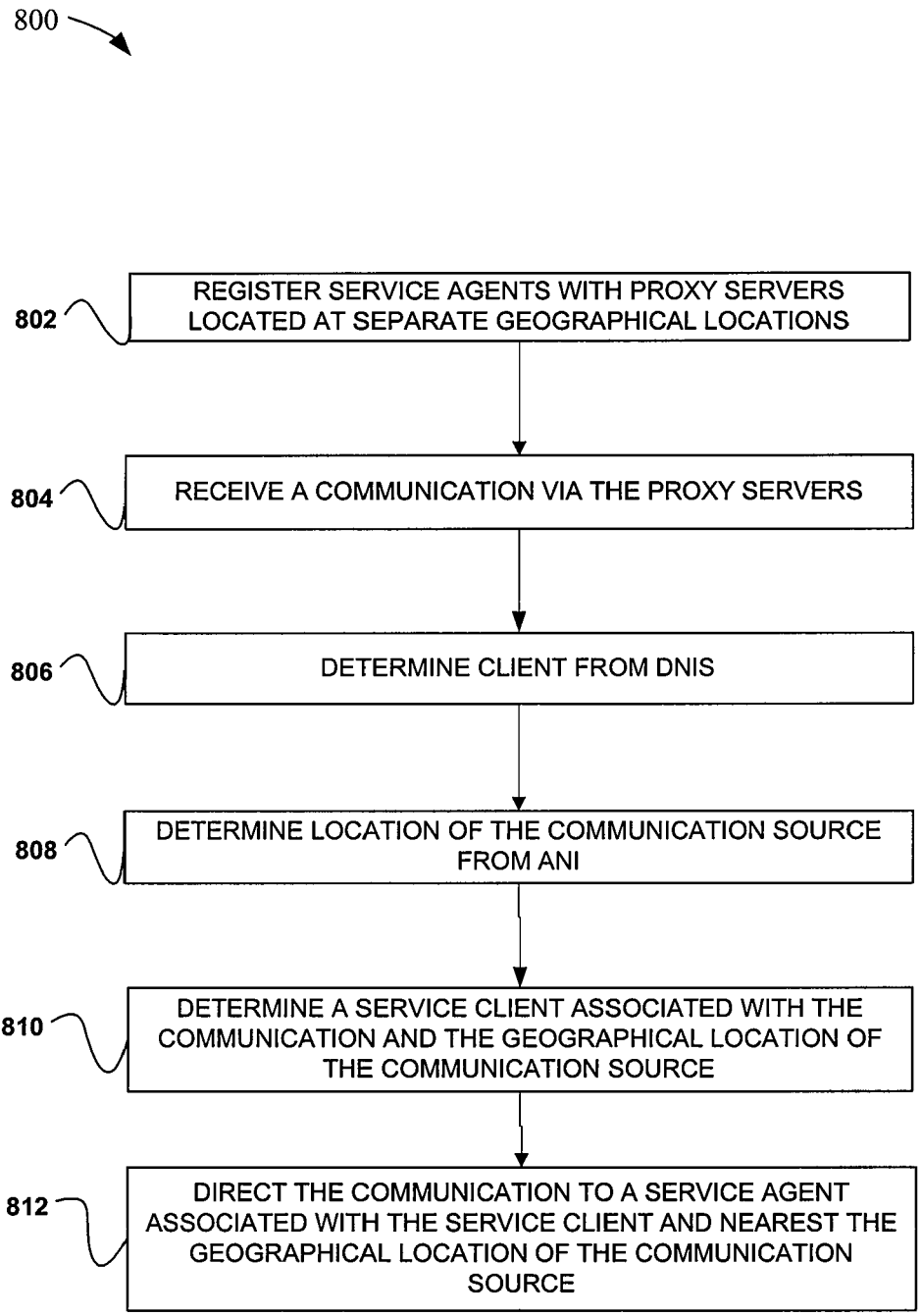
FIG. 8 is a flow diagram illustrating a further more detailed method for selection of a communication path, in accordance with an example embodiment.

FIG. 8 is a flow diagram illustrating a further more detailed method for selection of a communication path, in accordance with an example embodiment. As shown in FIG. 8, the method 800 may commence at operation 802 with the path selection module 504 of FIG. 5 registering service agents with proxy servers located at separate geographical locations. At operation 804, the communication module 502 of FIG. 5 may receive a communication via SIP. SIP is a signaling protocol, which may be used for setting up and tearing down multimedia communication sessions such as voice and video calls over the Internet. SIP may be utilized in creating, modifying and terminating unicast or multicast sessions consisting of one or several media streams.

SIP may require proxy servers to work as a practical service. Although two SIP endpoints may communicate without any intervening SIP infrastructure, this approach may be impractical for a public service. Thus, some example embodiments may include implementations of proxy servers. The proxy servers may be utilized to route requests from a customer's current location, authenticate and authorize customers for services, implement call-routing policies of the networked contact center, and provide features to the customers. SIP may also provide a registration function that allows agents to upload their current locations to the proxy servers to be utilized in selection of a path between a customer and an agent.

Referring back to FIG. 8, at operation 806 the path selection module 504 of FIG. 5 may determine whose tenant services are to be evoked. The determination may be made facilitated by Dialed Number Identification Service (DNIS). DNIS is a service that permits determining which telephone number was dialed by a customer. This is useful in determining how to answer an inbound call. A telecommunications company may send a DNIS number to the networked contact center during the call setup. A tenant may have a different toll free number for each product line it sells. If a call center is handling calls for multiple product lines, the switch that receives the call can examine the DNIS and play the appropriate recorded greeting.

DNIS may be utilized for dispatching purposes by using it as routing information to determine which script or service should be played based on the number that was dialed to reach the networked contact center. For example, phone numbers 906 123 4567 and 906 123 4568 may both connect to the networked contact center but one number may be designated to a sales department and the other may be an information line. DNIS helps to distinguish these lines from each other and therefore the networked contact center will know which service to provide to the caller.

At operation 808 of FIG. 8, the path selection module 504 of FIG. 5 may determine location of the communication source based on information provided by Automatic Number Identification (ANI). ANI is a feature of telephony intelligent network services that permits subscribers to display or capture the telephone numbers of calling parties.

Based on the information received at operations 806 and 808, the path selection module 504 may determine which tenant is associated with the communication and the geographical location of the calling customer. For example, an agent associated with a tenant may be located in California. The agent may respond to a telephone call from a customer who is also located in California. The customer may use PSTN to place the telephone call. SIP may be utilized to initiate the call. DNIS may permit determination of the appropriate tenant from the number dialed by the customer.

The call control component of the call is not sensitive to delays because it may be unimportant, for example, whether the telephone rang a second earlier or later. However, the delays in the voice component of the call are material because the quality of the conversations will deteriorate with an increased delay.

In some example embodiments, there may be a customer who wants all callers from a certain geographical location (e.g., the UK) to be directed to the same agent every time. Typically, the packets would travel to the local (e.g., the UK) PSTN first, then cross over to the networked contact center PSTN (e.g., the USA) before a SIP is created to reach the agent's SIP telephone. If the agent is located in California, USA and the packet travels from England with the speed of light, it may take less than 50 milliseconds. Such a delay may be acceptable. If, however, the agent is located in the UK, the packet is to travel back to the UK resulting in unacceptably long delay.

Systems and methods for selection of a communication path utilizes SIP proxies placed in several geographical locations. Agents are registered to these SIP proxies as described above. From information provided by ANI it may be determined where the call originated. The call control may still be kept in one location because it is not sensitive to delays. For example, there may be 10 agents in California and 10 agents in the UK available to respond to communications. When a call is originated in the UK, it is directed to the UK server first. The UK server may then direct the call to the UK agent. This approach permits directing the call via the shortest path instead of having the call reach the networked contact center in the US first and then be directed back to the UK agent. Since agents are registered to proxy servers in both geographical locations, each proxy server knows the agents' status. If, on the other hand the call comes from the US it may be directed to a US agent. Even though the agent is registered to multiple SIP proxies the method permits sending the call to an appropriately located agent because it is aware of the caller location. The queue for calls is duplicated in multiple locations but there is no duplication in sent calls because there is only one global queue. Thus, at operation 812 of FIG. 8, the path selection module 504 of FIG. 5 may direct the communication to a service agent associated with the service client 810 and the nearest the geographical location of the communication source.

Computer System

Figure 9:
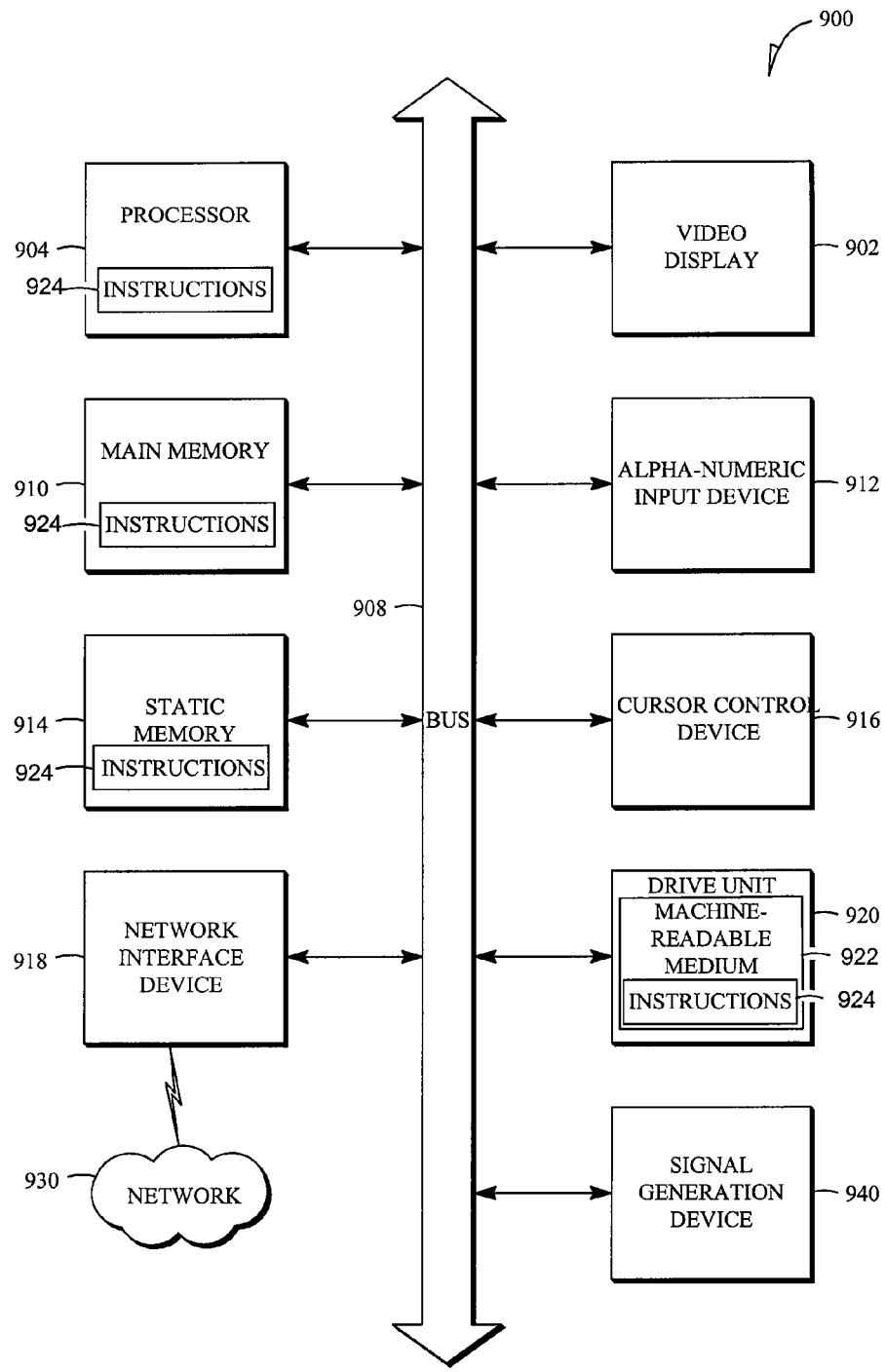
FIG. 9 is a diagrammatic representation of an example machine in the form of a computer system within which a set of instructions for causing the machine to perform any one or more of the methodologies discussed herein may be executed.

FIG. 9 shows a diagrammatic representation of a machine in the example form of a computer system 900 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a PC, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 904 (e.g., a central processing unit (CPU), a graphics processing unit (GPU) or both), a main memory 910 and a static memory 914 which communicate with each other via a bus 908. The computer system 900 may further include a video display unit 902 (e.g., a liquid crystal display (LCD) or a cathode ray tube (CRT)). The computer system 900 also includes an alphanumeric input device 912 (e.g., a keyboard), a cursor control device 916 (e.g., a mouse), a disk drive unit 920, a signal generation device 940 (e.g., a speaker) and a network interface device 918.

The disk drive unit 920 includes a machine-readable medium 922 on which is stored one or more sets of instructions 924 (e.g., software) embodying any one or more of the methodologies or functions described herein. The instructions 924 may also reside, completely or at least partially, within the main memory 910 and/or within the processor 904 during execution thereof by the computer system 900, the main memory 910 and the processor 904 also constituting machine-readable media. The instructions 924 may further be transmitted or received over a network 930 via the network interface device 918.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present subject matter. The term "machine-readable medium" shall accordingly be taken to include, but not be limited to, solid-state memories, optical and magnetic media, and carrier wave signals.

The above description is intended to be illustrative and not restrictive. For example, the above-described embodiments (or one or more aspects thereof) may be used in combination with each other. Other embodiments will be apparent to those of skill in the art upon reviewing the above description. The scope of the claims should, therefore be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A system for selecting a communication path related to a networked contact center, the system comprising:
    a communication module configurable to receive data that includes control data facilitated by a signaling protocol and that indicates that a customer of a tenant is seeking to initiate a communication with the tenant; and
    a path selection module configurable to:
        register a first location, the first location being a geographical location of an agent associated with the tenant,
        determine a second location, the second location being a geographical location of the customer of the tenant, and
        based on the first location and the second location, establish the communication between the agent and the customer by selecting a communication path having low communication latency as a function of the first location and the second location.

2. The system of claim 1, wherein the communication module is further configurable to establish the communication between the customer and the agent.

3. The system of claim 1, wherein the path selection module is further configurable to capture data communication between the customer and the agent.

4. The system of claim 1, wherein the signaling protocol is a Session Initiation Protocol (SIP).

5. The system of claim 1, wherein the data indicating that a customer of a tenant is seeking to initiate a communication with the tenant is received at least two proxy servers.

6. The system of claim 5, wherein the at least two proxy servers are configurable to maintain duplicate queues based on a global queue.

7. The system of claim 1, wherein the control data is received via a Real-time Transport Control Protocol (RTCP).

8. The system of claim 1, wherein media data is received via a Real-time Transport Protocol (RTP).

9. The system of claim 1, wherein the communication is received via a Public Switched Telephone Network (PSTN).

10. A computer-implemented method for selection of a communication path related to a networked contact center, the method comprising:
    registering a first location, the first location being a geographical location of an agent associated with a tenant;
    receiving data, that includes control data facilitated by a signaling protocol and that indicates that a customer is seeking to initiate a communication concerning the tenant;
    determining a second location, the second location being a geographical location of the customer of the tenant; and
    based on the first location and the second location, establishing a communication between the agent and the customer by selecting a communication path having low communication latency as a function of the first location and the second location.

11. The computer-implemented method of claim 10, further comprising capturing of data communication between the customer and the agent.

12. The computer-implemented method of claim 10, wherein the registering includes uploading information related to the agent to at least one proxy server.

13. The computer-implemented method of claim 10, wherein the data indicating that the customer is seeking to initiate the communication is received at a centralized location.

14. The computer-implemented method of claim 10, wherein the communication between the agent and the customer is established such that the latency is less than a predetermined value.

15. The computer-implemented method of claim 10, further comprising determining that the data indicating that a customer is seeking to initiate a communication concerning the tenant is based on a telephone number dialed by the customer.

16. The computer-implemented method of claim 15, wherein the determining is facilitated by a Dialed Number Identification Service (DNIS).

17. The computer-implemented method of claim 10, further comprising determining of the second location based on a telephone number dialed by the customer to initiate the communication.

18. The computer-implemented method of claim 17, wherein the determining is facilitated by an Automatic Number Identification (ANI).

19. A non-transitory computer-readable medium comprising instructions, which when implemented by one or more processors, perform the following operations:
    register a first location, the first location being a geographical location of an agent associated with a tenant;
    receive data that includes control data facilitated by a signaling protocol and that indicates that a customer is seeking to initiate a communication concerning the tenant;
    determine a second location, the second location being a geographical location of the customer of the tenant; and
    based on the first location and the second location, establish a communication between the agent and the customer by selecting a communication path having low communication latency as a function of the first location and the second location.

20. The computer-readable medium of claim 19, which when implemented by one or more processors, performs a further operation of capturing the communication between the customer and the agent.

21. The computer-readable medium of claim 19, wherein the registering includes uploading information related to the agent to at least one proxy server.

22. A computer-implemented apparatus for selection of a path in media communications related to a networked contact center, said apparatus comprising:
    means for registering a first location, the first location being a geographical location of an agent associated with a tenant;
    means for receiving data that includes control data facilitated by a signaling protocol and that indicates that a customer is seeking to initiate a communication concerning the tenant;

means for determining a second location, the second location being a geographical location of the customer of the tenant; and means for establish a communication between the agent and the customer using a communication path having low communication latency and selected based on the first location and the second location.

23. The computer-implemented apparatus of claim 22, wherein the signaling protocol is a Session Initiation Protocol (SIP).

* * * * *

UNITED STATES PATENT AND TRADEMARK OFFICE
CERTIFICATE OF CORRECTION

PATENT NO. : 8,204,206 B2
APPLICATION NO. : 12/201696
DATED : June 19, 2012
INVENTOR(S) : Townsend et al.

Page 1 of 1

It is certified that error appears in the above-identified patent and that said Letters Patent is hereby corrected as shown below:

In the Claims

Col. 15, line 47, Claim 5: "received at least" should read --received by at least--.

Signed and Sealed this
Fourth Day of February, 2014

Michelle K. Lee
*Deputy Director of the United States Patent and Trademark Office*